United States Patent
Cox et al.

(10) Patent No.: US 11,254,445 B2
(45) Date of Patent: Feb. 22, 2022

(54) AIRPORT RAMP SURFACE MOVEMENT MONITORING SYSTEM

(71) Applicant: Borealis Technical Limited, North Plains, OR (US)

(72) Inventors: Isaiah W. Cox, London (GB); Jan Vana, Prague (CZ)

(73) Assignee: Borealis Technical Limited

( * ) Notice: Subject to any disclaimer, the term of this patent is extended or adjusted under 35 U.S.C. 154(b) by 239 days.

(21) Appl. No.: 16/705,483

(22) Filed: Dec. 6, 2019

(65) Prior Publication Data
US 2020/0180783 A1   Jun. 11, 2020

Related U.S. Application Data

(60) Provisional application No. 62/776,130, filed on Dec. 6, 2018.

(51) Int. Cl.
*B64F 1/305* (2006.01)
*G05D 1/00* (2006.01)
*G01S 17/933* (2020.01)
(Continued)

(52) U.S. Cl.
CPC .............. *B64F 1/305* (2013.01); *B64D 43/00* (2013.01); *G01S 17/86* (2020.01); *G01S 17/933* (2013.01);
(Continued)

(58) Field of Classification Search
CPC . B64F 1/305; B64F 1/002; B64F 1/22; G05D 1/0027; G05D 1/0297;
(Continued)

(56) References Cited

U.S. PATENT DOCUMENTS

| 6,665,063 B2 | 12/2003 | Jamieson |
| 9,091,762 B2 * | 7/2015 | Knight .................. H04N 7/181 |

(Continued)

FOREIGN PATENT DOCUMENTS

| GB | 1917914.2 | 12/2019 |
| GB | 2576617 A | 2/2020 |

(Continued)

OTHER PUBLICATIONS

Ross Marowitz, Artificial Intelligence promises bright future for airlines and passengers, Apr. 29, 2018 https://www.ctvnews.ca/sci-tech/artificial-intelligence-promises-bright-future-for-airlines-and-passengers-1.3907375.

*Primary Examiner* — Muhammad Shafi (57) ABSTRACT

An integrated monitoring system and method are provided with the capability for monitoring ground surface movements of electric taxi drive system-driven aircraft, ground vehicles and personnel, and objects within airport ramp areas. Monitoring units may include a scanning LiDAR device with and without cameras or other sensing devices to transmit meshed real time encrypted data from multiple locations to an artificial intelligence-based processing system that generates a visual display of the monitored area for communication to aircraft cockpits and locations responsible for controlling ramp operations. Monitoring units may be mounted in single or multiple exterior locations on aircraft and/or in locations on ground vehicles and equipment, ground personnel, and the airside portion of an airport terminal.

18 Claims, 2 Drawing Sheets

(51) Int. Cl.
   *B64D 43/00* (2006.01)
   *G01S 17/86* (2020.01)
   *G05D 1/02* (2020.01)
(52) U.S. Cl.
   CPC ......... *G05D 1/0027* (2013.01); *G05D 1/0297* (2013.01)
(58) Field of Classification Search
   CPC ........ G01S 17/933; G01S 17/86; G01S 17/93; G01S 17/89; B64D 43/00
   USPC ............................................................ 701/2
   See application file for complete search history.

(56) References Cited

U.S. PATENT DOCUMENTS

| | | | |
|---|---|---|---|
| 9,394,059 B2 * | 7/2016 | Cox | B64C 25/405 |
| 9,958,867 B2 * | 5/2018 | Cox | B64C 25/405 |
| 10,308,352 B2 | 6/2019 | Cookman et al. | |
| 2015/0051757 A1 * | 2/2015 | Cox | B64C 25/405 701/3 |
| 2015/0142214 A1 * | 5/2015 | Cox | G05D 1/0083 701/3 |
| 2015/0166174 A1 * | 6/2015 | Cox | B64F 1/3055 244/50 |
| 2016/0196754 A1 * | 7/2016 | Surace | G08G 5/0013 701/117 |
| 2016/0247406 A1 * | 8/2016 | Khatwa | G01S 19/51 |
| 2016/0351061 A1 | 12/2016 | Lamkin et al. | |
| 2020/0013301 A1 | 1/2020 | Vana et al. | |

FOREIGN PATENT DOCUMENTS

| | | | | |
|---|---|---|---|---|
| WO | WO-2012122526 A2 * | 9/2012 | ........... | B64C 25/405 |
| WO | WO-2012174572 A1 * | 12/2012 | ........... | B64C 25/405 |

\* cited by examiner

AIRPORT RAMP SURFACE MOVEMENT MONITORING SYSTEM

PRIORITY CLAIM

This application claims priority from U.S. Provisional Patent Application No. 62/776,130, filed 6 Dec. 2018, the entire disclosure of which is fully incorporated herein in its entirety.

FIELD OF THE INVENTION

The present invention relates generally to systems and methods for monitoring airport surface movement and specifically to an improved airport ramp surface monitoring system and method that provides data useful for directing surface movements of aircraft and other vehicles traveling on ramp ground surfaces to prevent collisions and ground incidents and enhance safety and security of airport ramp operations.

BACKGROUND OF THE INVENTION

Airport ground travel surfaces, particularly apron or ramp areas, can be very congested places at today's airport terminals. Multiple aircraft are simultaneously arriving and departing, ground-based service and support vehicles and personnel are servicing parked aircraft, and ground crews are directing the arriving and departing aircraft into and out of gates. In addition, the entrances and exits between taxiways and these congested ramp areas may themselves become congested as multiple aircraft move into and out of ramp areas to park and transfer passengers and cargo. The avoidance of collisions and similar adverse ground incidents in these areas requires careful monitoring and control of the locations and movements of aircraft, ground vehicles, equipment, and personnel as aircraft are maneuvered on the ramp surfaces. Whether the aircraft are maneuvering into a parking location or being pushed back at departure, ground crews currently guide the moving aircraft, largely because the pilot and flight crew are not able to see the entire ground environment or space surrounding the aircraft. The sides and rear of the aircraft exterior, from the ground surface to above the wings, are not visible to the pilot and flight crew from the cockpit. The use of cameras and sensors mounted on aircraft exterior locations has been helpful. However, despite the availability of these devices, incidents involving collisions during ground maneuvers within an airport ramp area, for example between moving and parked aircraft and moving aircraft and ground service vehicles and equipment, still occur all too frequently.

It has been proposed to attach ADS-B or other transponders to every ground vehicle to monitor the movements of these vehicles. While this may provide some data relating to the positions and movement of the ground vehicles with transponders, the cost of outfitting all of the ground vehicles at an airport with transponders is significant. In addition, the information that may be obtained from the transponders may be limited. For example, such monitors do not identify sizes and shapes of objects. Ramp areas may include many objects, including carts and tow bars, as well as luggage that has fallen off a cart, that do not move and could be the source of ground incidents involving moving ground vehicles and aircraft. Such objects are not likely to be detected by the proposed transponders.

The efficiency, speed, and safety of ramp surface operations, whether during aircraft taxi-in at arrival, push back at departure, or other aircraft movements within an airport ramp area, may be adversely affected by the ground congestion found in the ramp areas at most large airports. Multiple airlines concurrently conduct both push back and arrival operations for multiple aircraft, and aircraft often must park in parking locations with minimal safe clearance. This strains both the available ground personnel and the available equipment. Aircraft turnaround times may be increased significantly when ground personnel and tow bars, adapters, tugs or other equipment are not available when needed. Turnaround delays for these reasons have become all too common.

Driving an aircraft on the ground independently during taxi with pilot-controlled landing gear wheel-mounted electric taxi or other drive systems without reliance on operation of the aircraft's main engines or the use of tow vehicles has been proposed by Applicant and others. As the pilot controls operation of the electric taxi drive system to maneuver an aircraft independently of engines and tugs within the ramp area or during taxiing to and from the ramp area, pilot situational awareness may be increased compared to when aircraft are driven only with operating engines. Increased pilot situational awareness is likely to improve aircraft ground travel safety. Additional monitoring of the ground level environment external to the portions of the aircraft not readily visible to the pilot or crew driving the aircraft and analysis of the data obtained, however, would further improve pilot situational awareness, avoid potential collisions, and enhance safe operation of the aircraft as they are driven independently with electric taxi drive systems into and out of congested airport ramp areas. Facilitating the monitoring of the ramp environment by ground personnel and air traffic control personnel may also avoid potential collisions and enhance safe ramp operations.

Applicant has proposed a monitoring method useful during accelerated push back for aircraft driven with engines-off or electric taxi drive systems that includes a plurality of different types of sensing devices mounted on the exterior of the aircraft in U.S. Pat. No. 9,394,059. Scanning an aircraft's landing zone area to target obstacles while an aircraft is still in the air has also been proposed, for example in U.S. Pat. No. 6,665,063.

Some airport ramp area monitoring devices and systems are also available, including the Safedock docking system mounted on terminal gates that employs LiDAR technology to automatically guide pilots into assigned gate parking locations. Closed circuit television (CCTV) cameras may be supplied at gate locations in airport ramp areas at many airports. Such CCTV cameras may monitor gate security, among other uses. Employing these cameras in combination with a computer-based data collection and analysis system and associated software has been proposed to keep track of specific services rendered in gate areas in connection with an aircraft's turnaround. Such a system may monitor ramp areas as seen from the positions of the CCTV cameras on the gates and/or terminal buildings and may provide a record of various activities during aircraft turnaround; however, the extent of the ramp area monitored may be limited by the fixed locations of these cameras. Additionally, the information obtained by CCTV and other cameras is limited during low visibility weather conditions. It has not been suggested to mesh data obtained from these or other diverse airport sources to minimize ramp incidents and improve ramp safety.

Artificial intelligence (AI), very generally defined as machine intelligence, has received much attention lately, and its potential applications are currently the focus of significant research and discussion. A range of automated applications, including driverless cars, assisted medical diagnosis, and personal assistants, exemplify a few of the present suggested or actual uses of artificial intelligence. Airline and airport operations, of necessity, must focus on establishing and maintaining safety and have relied on human control and intervention to achieve an increasingly safer level of air travel. While airlines and airports have employed artificial intelligence to improve some aspects of passenger experience, such as answering common passenger questions with chatbots and verifying boarding and luggage with facial recognition, it has been thought difficult to continue to maintain safety, especially in the ramp area, while relinquishing human control and intervention in other operations.

That artificial intelligence might be useful in the airline industry has been recognized, and the airline industry's investment in artificial intelligence is expected to increase from about US$152 million in 2018 to an estimated about US$2.22 billion in 2025, with no suggestion of specific airline, aircraft, or airport operations or functions that could be coupled to artificial intelligence. It is estimated that global passenger traffic is likely to double over the next two decades, which will strain existing air traffic control and other airport, and airline, aircraft and passenger handling systems, as well as ramp surface operations. The constant monitoring of ground surface movements of aircraft, other vehicles, and personnel within airport ramp areas, both from monitoring systems on the aircraft and on the vehicles and from monitoring systems on airport structures, coupled with the transmission and meshing of data and the analysis and automatic control possible using intelligent algorithms and artificial intelligence, could improve the safety, efficiency, and security of airport ramp operations. The handling of the expected increase in global passenger traffic by airports and airlines may be facilitated by the implementation of such a monitoring system, and a need exists for an integrated monitoring system and method capable of achieving these objectives.

SUMMARY OF THE INVENTION

It is a primary object of the present invention, therefore, to provide an integrated monitoring system and method with the capability for constant monitoring of ground surface movements of aircraft, ground service vehicles, and personnel within airport ramp areas from multiple monitoring systems on the aircraft and on the ground service vehicles, and from monitoring systems on personnel and airport structures, to produce meshed data from the multiple monitoring systems that may be processed and analyzed, and ground surface movements of all objects and personnel within airport ramp areas controlled in response to the meshed data to improve the safety, efficiency, and security of airport ramp operations.

It is another object of the present invention to provide an integrated monitoring system with multiple monitoring units that may include single ones or a combination of monitoring devices that generate and transmit data to be processed using intelligent algorithms and artificial intelligence to constantly monitor ground surface movements of aircraft and all other objects on ramp surfaces to produce a real time constant stream of meshed data in a secure encrypted form that may be automatically processed, analyzed, and used to control the ground surface movements of the aircraft, objects, and personnel within the ramp area and enhance the safety and efficiency of airport ramp operations.

It is another object of the present invention to provide a monitoring system with multiple monitoring units employing a combination of different monitoring devices to produce a composite feed of meshed real time and recorded data for aircraft driven only with electric taxi drive systems during ground surface travel that generates views of the airport ramp area from the multiple monitoring units for communication to the cockpits of electric taxi drive system-driven aircraft and to other selected locations and enables automatic or manual control of the electric taxi drive system as indicated to avoid a collision or other ground incident.

It is an additional object of the present invention to provide a monitoring system for aircraft driven with electric taxi drive systems during ground surface travel at an airport employing multiple monitoring units, each of which may be a combination of a camera and a scanning LiDAR device operative to produce meshed real time and recorded data with views of the entire airport ramp ground travel surface from the multiple monitoring units for communication to aircraft cockpits and to other selected locations in a secure encrypted form.

It is an additional object of the present invention to provide a monitoring system for aircraft driven with electric taxi drive systems during ground surface travel at an airport that employs monitoring units capable of generating clear and accurate information relating to objects, including foreign object debris (FOD), present on the airport ground surfaces where the aircraft is driven with the electric taxi drive systems and transmitting this information to at least the aircraft's cockpit and an airport control tower.

It is a further object of the present invention to provide a monitoring system for an aircraft driven with electric taxi drive systems during ground surface travel at an airport with one or more on-aircraft monitoring units that may include a scanning LiDAR device, alone or in combination with a camera or another sensing device, to produce meshed real time and recorded data from the on-aircraft monitoring units for transmission to a processing system with intelligent algorithms and communication of the processed data in the form of a visual display of the areas monitored by the on-aircraft monitoring units to at least the aircraft's cockpit, to ground control, and to air traffic control in an encrypted secure format.

It is yet a further object of the present invention to provide a method for monitoring ground surface travel of aircraft driven by electric taxi drive systems in an airport ramp area and ground surface travel of other aircraft, vehicles and equipment moving within the airport ramp area with at least one monitoring unit mounted on each of the aircraft, vehicles, and equipment capable of producing and communicating meshed real time and recorded data from all of the monitoring units on each of the aircraft, vehicles, and equipment to be processed and transmitted to aircraft cockpits, to ground control, and to air traffic control in an encrypted secure format.

It is yet a further object of the present invention to provide a monitoring method that employs a scanning LiDAR device, either alone or combined with a different sensing device in a monitoring unit to produce meshed real time and recorded data that is mounted on ground personnel or on mobile robotic units for transmitting a view of known blind spots to pilots of aircraft maneuvering into or out of an airport ramp area stand or gate.

It is yet a further object of the present invention to provide an artificial intelligence-based monitoring method for monitoring all ground surface travel and operations within an airport ramp area that produces meshed data and employs intelligent algorithms to report and track information and alerts relating to aircraft and ground vehicle movements and immobile object positions within the ramp area to facilitate solution of identified potential collision and other problems in real time and prevent incidents in the ramp area.

It is yet a further object of the present invention to a method for improving security within an airport ramp area in the case of intrusion within the ramp area by suspected unauthorized or dangerous persons, including potential terrorists, when aircraft, vehicles, and airport structures are equipped with monitoring units that may be scanning LiDAR devices, alone or in combination with cameras, capable of producing and securely transmitting to rapid response teams meshed real time data in the form of visual displays of views generated from the meshed real time data.

It is yet a further object of the present invention to provide a method for improving the efficiency and safety of ramp ground surface operations at an airport with a three-dimensional digital map of the airport airside ramp area where aircraft, ground service vehicles, and stationary structures are equipped with monitoring systems including at least scanning LiDAR monitoring units to produce data relating to ground surface movements that may be securely meshed with the airport three-dimensional map and processed by an intelligent processing system to prioritize and optimize all of the airside ramp activities and to control these activities and ground surface movements locally or remotely as required to maintain airside safety and efficiency.

In accordance with the aforesaid objects, an integrated monitoring system and method are provided with the capability for monitoring ground surface movements of aircraft, ground service vehicles, objects, and personnel within airport airside ramp and other areas. Multiple monitoring units on aircraft, on ground service vehicles, on personnel, and on airport structures produce composite streams of real time data that may be securely meshed and transmitted to a processing system employing intelligent algorithms for processing and analysis to generate a visual display of the monitored area for communication to aircraft pilots and airport control personnel with responsibility for controlling airport ramp surface operations. This enables control of ground surface movements to improve the safety, efficiency, and security of airport ramp and airside operations. A monitoring unit may be a scanning LiDAR device, either alone or in combination of with a camera or another sensing device, that may be mounted in exterior locations on aircraft driven with electric taxi drive systems and on ground service vehicles, and also on personnel and airport structures within the ramp area. Meshed real time and recorded data from the monitoring units, including views of the entire ramp area or airport airside area, may be transmitted to the artificial intelligence-based processing system and may be communicated as an integrated visual display to aircraft cockpits and other locations responsible for ramp operations and security. Meshed data and other data transmitted through the integrated monitoring system should be encrypted to improve transmission security and deter hacking.

An aircraft's ground travel may be automatically or manually altered to avoid identified safety hazards and to avoid collisions as the aircraft is driven with the electric taxi system within the ramp area. Monitoring units may additionally be mounted on ground service support equipment and on aircraft not driven by electric taxi drive systems, as well as on gates, passenger loading bridges, and terminal building structures within or adjacent to the ramp area. Hazard data information and alerts may be provided by the system to all parties that may be involved in a potential incident, including aircraft pilots, drivers of ground service vehicles, operators of ground service equipment, and those with primary responsibility for overall ramp safety, which may include air traffic control and ground control.

A method for improving the safety, efficiency, and security of airport ramp and airside operations with the foregoing system is also provided. The present monitoring system and method will be able to detect, process, and analyze data integrated from monitoring units mounted on electric taxi-driven aircraft, other aircraft, and ground service vehicles, and from other data sources in an airport ramp area to provide visual displays that identify and provide warnings to aircraft pilots and others about potential ramp safety hazards and to detect abnormal activities within the ramp, including possible breaches of security or terrorist activity. When an airport ramp area can achieve the level of safety and security provided by the present monitoring system and method, significant improvements in the efficiency and safety of airport ramp and airside ground surface operations may be produced.

Other objects and advantages will be apparent from the following description, claims, and drawings.

DESCRIPTION OF THE INVENTION

As noted above, moving aircraft into, out of, and within congested airport ramp surface areas while avoiding collisions and other adverse ground incidents is critical to maintaining the safety of all persons and vehicles in this portion of an airport. Monitoring the ground travel environment of aircraft, as well as that of ground service and other vehicles that are moving in these congested areas, will help to avoid collisions between moving aircraft and other moving or stationary vehicles, personnel, and equipment, significantly improving the safety and efficiency of airport ramp ground operations. Monitoring systems may improve situational awareness as aircraft pilots and flight crew are driving an aircraft during ramp ground surface operations by providing a clear view of the spatial environment around the moving aircraft from the cockpit, as well as from ramp and ground control perspectives. Real time meshed data collected and analyzed from the monitoring systems may enable manual or automatic control of the aircraft's electric taxi drive system more quickly than has been possible to alter the aircraft's ground travel and avoid a potential collision incident. Data collected and analyzed may also be employed to manually or automatically control movement of ground service vehicles and equipment. The monitoring of overall ramp surface operations, including movements by ground service vehicles, personnel, and equipment, as well as aircraft that are and are not equipped with electric taxi systems, to obtain real time meshed data that may be processed, analyzed, and categorized by computers using artificial intelligence and intelligent algorithms may also improve safety, security, and efficiency of ramp operations.

The terms "artificial intelligence" and "intelligent algorithms" are used herein to refer to and encompass systems of data processing and analysis that are conducted by computers capable of harvesting large amounts of possible input data, including images and other information from monitoring and sensing devices, that may be processed, analyzed, and categorized based on a set of rules and then may be communicated so that appropriate action may be taken, whether automatically by a system receiving the processed and analyzed data or manually by a human.

The terms "ramp", "ramp area", and airport "airside area" will be used herein to refer to the area at an airport that is intended to accommodate aircraft for the loading and unloading of passengers, mail, cargo, fueling, parking, or maintenance and is synonymous with the term "apron," which is also used to identify this area at an airport. The airport airside area encompasses an area of the airport that may be coextensive with or larger than the ramp area.

"Electric taxi drive systems" and "electric taxi systems" refer to pilot-controllable systems used to drive aircraft without reliance on and independently of operation of aircraft engines and external tow vehicles that include landing gear wheel-mounted electric drive motors and motor components activatable to drive the aircraft during ground travel in response to pilot control. An example of an electric taxi system developed by Applicant to drive an aircraft independently during ground travel without reliance on operation of the aircraft's engines or attachment to external tow vehicles is described in commonly owned U.S. Pat. No. 10,308,352, the disclosure of which is fully incorporated herein in its entirety by reference. Other drive systems using drive motors that are not electric, including, for example, hydraulic or pneumatic drive motors may also drive aircraft in connection with the intelligent monitoring system and method of the present invention and are contemplated to be included within the terms "electric taxi drive systems."

Figure 1:
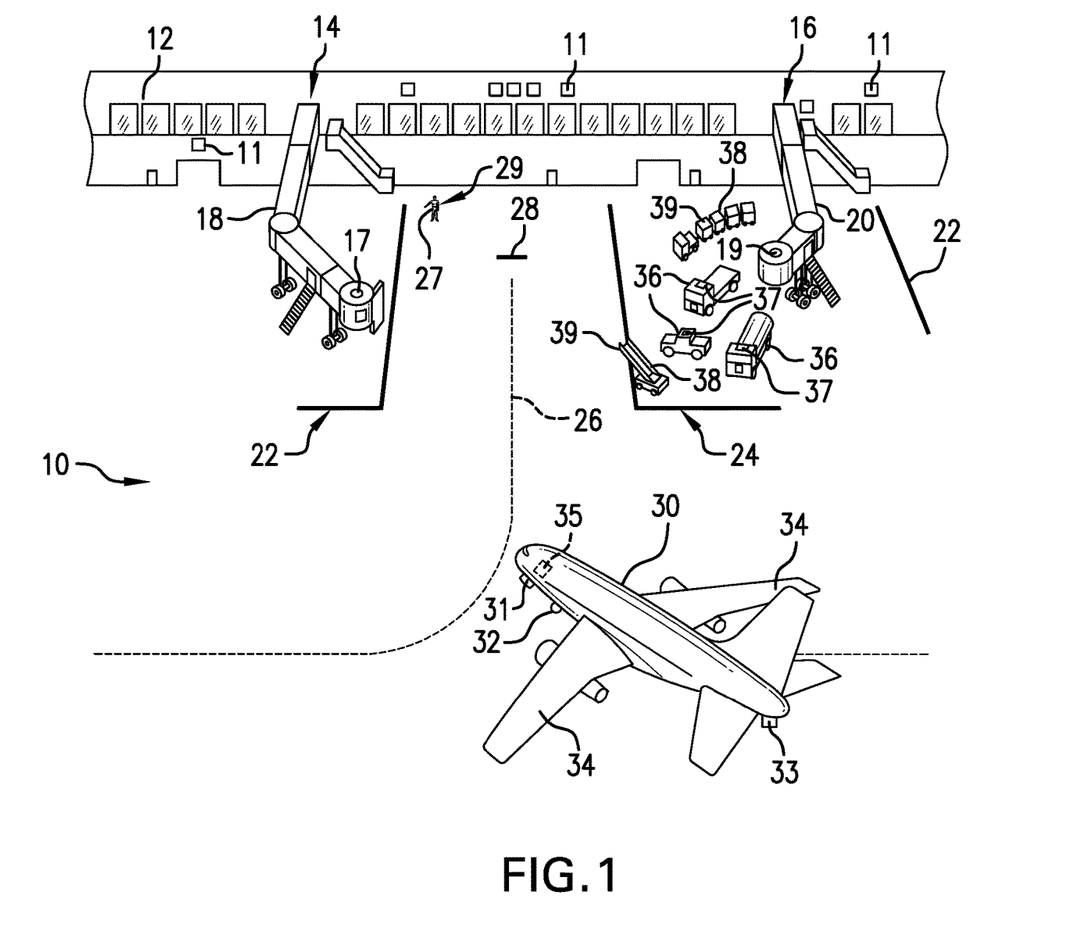
FIG. 1 is a diagrammatic view of an airport ramp area or airside area equipped with the monitoring system of the present invention showing locations of gates with passenger loading bridges, ground service vehicles, and personnel and also showing a single aircraft equipped with an electric taxi system powering the aircraft's ground movement and the present monitoring system as it is driven into the ramp area by the electric taxi system.

Referring to the drawings, which may not be drawn to scale, FIG. 1 is a diagrammatic view of a portion of an airport ramp area 10 with a terminal building 12. Two gates 14 and 16 and their respective passenger loading bridges 18 and 20 are shown. Only part of the airside terminal building adjacent to the ramp area 10 is shown. Depending on the size of the airport, there are likely to be a number of additional gates, and the terminal building may also have a different configuration, for example a U-shape with opposed gates and passenger loading bridges. The ground surface of the ramp 10 may be marked with lines that indicate safety margins for ground equipment and passenger loading bridges. In FIG. 1, lines 22 indicate what are termed "foul lines" for the passenger loading bridges 18 and 20, and line 24 indicates a foul line for ground service equipment near gate 16. A similar foul line (not shown) may be marked near gate 14. A taxi line 26 guides the aircraft 30 to a stop location 28, where the aircraft may be parked.

According to one estimate, over 80% of ground incidents in ramp areas occur within the gate stop area and the gate entry and exit locations. Aircraft 30 is shown entering the gate entry location for gate 14. While marking foul lines, taxi lines, and stop locations on the ramp ground surface and providing ground personnel 29 may be helpful in guiding aircraft into ramp areas and parking locations, this has not prevented the occurrence of collisions and other ground incidents within ramp areas. A monitoring system and method that may survey the entire ramp surface and adjacent airside areas during ground movement of aircraft, ground service vehicles, and passenger loading bridges from a number of perspectives to produce data from multiple sources that may be meshed to generate a view of the entire ramp area for communication to pilots and crew in aircraft cockpits and those outside aircraft with responsibility for ramp safety is needed and is provided by the present invention.

The monitoring system and method of the present invention is particularly well suited to aircraft equipped with electric taxi drive systems that move the aircraft during ground travel, particularly in a ramp area, without reliance on operating aircraft engines and tow vehicles. Aircraft driven on a ground surface with aircraft engines and moved by tow vehicles, not by electric taxi systems, may also benefit from the present ramp surface movement monitoring system and method. The present system and method may survey and monitor a maximum portion of an aircraft's external ground environment where potential obstructions are likely to be found and communicate information about ground environment conditions, including the presence or absence of obstructions, that may impact the safety of continued aircraft movement. A pilot may then control the electric taxi drive systems, or in the case of aircraft not equipped with electric taxi drive systems, to appropriately control movement of the aircraft in response.

Preferred monitoring units for the present monitoring system should provide expansive views of not only a maximum space or volume adjacent to the aircraft exterior but also views of an entire ramp area in any visibility or environmental conditions and should be able to communicate information relating to potential and actual adverse ramp situations that could result in a collision or other adverse incident to those able to prevent such incidents. A type of monitoring unit that may provide and communicate this information is a scanning LiDAR device, either alone or in a combination with a camera or another sensor. Single or multiple ones of these monitoring units may be attached to exterior locations on aircraft, on ground service vehicles, on equipment, and on ground personnel to expand the views of all aspects of an airport ramp area and, when needed, to produce alerts or warnings of potential incidents that may be transmitted to aircraft pilots, ramp control personnel, air traffic control, and others with a need to receive the data. These monitoring units may generate meshed data from multiple sources for processing and analysis, preferably by a processing system driven by intelligent software, and then communicate the meshed data in a secure encrypted form to pilots and all others with responsibilities for ramp safety in real time or in a recorded form.

For maximum effectiveness, monitoring an aircraft's ground environment at different heights above the ramp ground surface may ensure that a variety of different kinds of potential obstructions may be detected with the monitoring units. The monitoring units should have the capability to continuously and intermittently scan or "sweep" an aircraft's exterior at all times while it is moving into, within, and out of the ramp area. Monitoring units may optimally operate continuously, intermittently, or in an optimum combination of continuous and intermittent operation to provide a constant stream of real time data during ramp ground surface operations. In one possible monitoring unit configuration of a scanning LiDAR device and a camera, the camera may be set to operate continuously, while the scanning LiDAR device may be set to operate intermittently. Other combinations of continuous and intermittent operation may also be used. This capability may enable the pilot, and potentially ground or ramp control personnel, to control operation of an electric taxi drive system to change aircraft travel direction or stop the aircraft at any time, for example when presence of an obstruction is detected.

Monitoring units, such as monitoring units 31 and 33 shown schematically on aircraft 30 in FIG. 1, may be located in positions on the exterior of an aircraft at different heights above the ground so that a complete view of the space all around the aircraft may be obtained. Possible locations include in the vicinity of the nose landing gear to ensure that the pilot has a clear view of the aircraft's nose landing gear and the ramp ground surface from this perspective. For example, monitoring unit 31, shown on the fuselage exterior near the aircraft 30 nose end, may be mounted on a nose landing gear strut or other nose landing gear structure. The monitoring unit 33, shown mounted on the fuselage near the aircraft 30 tail end, may be mounted in other locations that will provide a view of the space around the tail, which may be viewed during push back. A scanning LiDAR device may provide a 360° panoramic view from a desired perspective. If a camera is used, the camera portion of the monitoring unit may be a wide-angle camera to provide an expansive view of the nose landing gear area. Such views may assist the aircraft pilot to stay on the taxi line 26 in the event that the nose wheel must be steered at a sharp angle. Additional monitoring units 37 and 39 may be respectively located, for example, on ground service vehicles 36 and on ground service equipment 38. It is also contemplated that monitoring units 11 may be placed in multiple locations on the airside surface of the terminal 12, and that monitoring units 17 and 19 may be placed on passenger loading bridges 18 and 20. A monitoring unit 27 may also be worn by or attached to ground personnel, such as the ground crew member 29. The locations of the monitoring units 11, 17, 19, 27, 31, 33, 37, and 39 are intended to illustrate examples of possible locations for these monitoring units on the structures and personnel shown in FIG. 1. Other locations for the monitoring units are also within the scope of the present invention. The actual and optimal placement of the monitoring devices to produce the most effective meshed real time data relating to ramp surface ground movements of aircraft, ground service vehicles, and personnel may be different for each airport ramp area.

Additional sensors, sensor devices, monitoring devices, and the like, preferably digital or smart devices, that are designed to provide information about objects in or near an aircraft's ground travel path into, within, and out of the ramp area may also augment the capabilities of and provide back-up for the present monitoring system and method. For example without limitation, proximity sensors, ultrasound, radar, sonar, LADAR, and global positioning systems (GPS), similar to those currently used for enhanced environmental monitoring in automobiles, but specifically adapted for aircraft and airport vehicle use may enhance the capabilities of the monitoring units described herein. If the effectiveness of one type of sensor or monitoring device is limited, for whatever reason, other sensors or monitoring devices may be available to monitor an electric taxi drive system-driven aircraft's ramp travel and communicate the presence or absence of obstructions in the aircraft's ground travel path to the cockpit and other control locations. Any of the foregoing sensors, sensor devices, and monitoring devices may also be used on ground service vehicles, ground service equipment, on ramp structures such as passenger loading bridges, and on ramp ground personnel, either alone or in addition to the monitoring units described herein.

Monitoring units useful with the present monitoring method may be removably or permanently attached to or embedded in exterior aircraft and ground vehicle and equipment structures at locations selected to maximize the extent of environmental information obtained during aircraft forward and reverse ground travel on ramp area surfaces. These monitoring units should preferably be capable of checking for obstructions at a range of heights above a ground surface relative to an aircraft for maximum opportunity to detect structures and/or objects that might interfere with or obstruct aircraft movement within the ramp area. Monitoring units attached to aircraft exterior surfaces may have aerodynamic configurations to minimize drag during flight.

Ramp ground personnel may additionally be provided with smart devices that use artificial intelligence to assist them with a range of ramp operations. Such smart devices may include the head-mounted devices that are designed to receive information that could be generated by processing and analyzing data relating to relative locations of aircraft and other ramp vehicles and equipment from the monitoring and sensor devices described above and communicated to ground personnel in real time. Ramp ground personnel receiving this data may be in positions to receive and then communicate warnings of potential ground incidents and collisions to aircraft pilots and ground vehicle operators more quickly than others.

Many, if not most, airport ramp areas have blind spots that may pose challenges for moving aircraft, particularly during pushback. Use of data from the monitoring units of the present invention mounted on aircraft in conjunction with data from the airport's three-dimensional digital airside map may be used to highlight relevant blind spots that could present obstacles to safe aircraft ground movement and bring these blind spots to the attention of aircraft pilots, ground control, and ground personnel. For example, in a ramp location where there is a corner and the pilot of an aircraft being pushed back cannot see around the corner to ensure that push back can be conducted safely, a monitoring unit as described herein, for example monitoring unit 33, that is positioned in a suitable location at or near the rear of the aircraft may generate a view around the corner that will allow the pilot and ground control to conduct push back without risk of collision. Alternatively or in addition, the present monitoring units may be attached to ground personnel to confirm whether the area around the corner or in another blind spot is clear of possible obstructions and aircraft ground movement can continue or whether aircraft ground movement must stop until the area is clear, and then can safely continue reverse or forward movement. The present invention further contemplates attaching monitoring units to roving units, for example ground personnel robots. These ground personnel robots equipped with monitoring units may perform the same functions as wing walkers, and would also be able to "see" around corners with the monitoring unit and generate a real time view of the area from the meshed data transmitted by the multiple monitoring units. This view may be transmitted by the processing system to the aircraft cockpit and to other locations as described herein. A scanning LiDAR device, optionally combined with a camera as described above, provides a clear view around corners and of other airport blind spots in virtually all environmental conditions, including those with limited or minimal visibility.

In one embodiment of the present monitoring system and method, monitoring units are attached only to ground personnel and/or roving units and not to the aircraft, and the view generated by the meshed data from the ground personnel or roving units' monitoring units is transmitted to pilots in aircraft cockpits.

In addition to generating views of aircrafts' exteriors as the aircraft are driven in forward and in reverse on ramp ground surfaces, the monitoring units and system of the present invention may provide views of aircraft exterior environments as the aircraft are driven on airport ground surfaces outside the ramp area, including on the taxiway and runway tarmac surfaces. This capability should provide clear and accurate views of the entire airport airside area and everything within the range of the monitoring units, including without limitation aircraft, ground service equipment and vehicles, personnel, and objects. Foreign object debris (FOD) on tarmac surfaces would also be visible, making the FOD more easily identified and its removal more efficient.

Meshed data from a scanning LiDAR device and/or a camera or other sensor in each monitoring unit may be sent to an artificial intelligence-based processing system, shown schematically at 35 on aircraft 30 in FIG. 1, that is preferably an artificial intelligence-based system capable of intermediate and high level image understanding. The processing system 35 may be located on the aircraft, as shown, or in a control or other location off the aircraft, such as a ground or ramp control location or an airport control tower location, where meshed data from multiple monitoring units may be securely transmitted for processing and communication. It is contemplated that all data transmissions through the present monitoring system will be encrypted for security and to prevent hacking. The artificial intelligence-based processing system described herein may have the capability to interpolate a three-dimensional view from a single two-dimensional image, in much the same way a human is capable of generating such an image. The present monitoring system may also employ intelligent algorithms to analyze data relating to ramp movements and locations of aircraft and other vehicles and equipment and then identify inefficiencies in the turnaround process and other ramp operations, which may be communicated to ramp operations supervisors and personnel, air traffic control, pilots, and others involved with aircraft turnaround and ground surface movement. It is also contemplated that the artificial intelligence-based processing system may log exceptions and report and track alerts associated with ramp incidents. This and relevant other data may be used to compare what should happen in response to a ramp incident with what actually happens so that ramp operations may be optimized.

While a video display may be preferred to show, in real time, the exterior of the aircraft and/or a map of the aircraft's surroundings that may include relative locations and distances of other aircraft, ground vehicles, and objects that might pose obstructions or collision threats as the aircraft and other vehicles move through the ramp, information relating to the aircraft's ground environment may also be communicated in other ways. Video displays and/or acoustic indicators known in the art may be used and are contemplated to be within the scope of the present monitoring method.

The aircraft 30 in FIG. 1 is equipped with a pilot-controllable electric taxi drive system that powers aircraft ground movement without operating engines and tow vehicles. A preferred electric taxi drive system may include a pair of electric drive motors mounted completely within the wheel volume in each nose landing gear wheel 32 or, alternatively, within one or more of the main landing gear wheels on aircraft 30; the main landing gear wheels on aircraft 30 are not visible in FIG. 1. The electric taxi drive system is controlled by a pilot or the crew of the aircraft from the cockpit to drive an arriving aircraft into the ramp area 10, maneuver the aircraft within the ramp area into a parking location, such as that designated by the stop location 28, and then drive a departing aircraft in forward or reverse out of the ramp area.

The pilot and crew driving the aircraft 30 on the ground with the electric taxi system, or in any other manner, have a relatively limited view and cannot see all of the aircraft's exterior or the ramp area environment surrounding the aircraft from the cockpit. Consequently, as the aircraft 30 is driven into, within, and out of the ramp area, the presence of other aircraft, ground vehicles, equipment, and personnel near portions of the aircraft's exterior that are not visible from the cockpit poses collision and other hazard risks. The monitoring units 31 and 33 in the present monitoring system employ meshed real time data from at least a scanning LiDAR device and/or scanning LiDAR devices combined with cameras to provide visual information and a field of view around the aircraft nose and tail, and potentially beyond these spaces, in all weather and environmental conditions as the aircraft are driven through the ramp area. The monitoring units 11, 17, 19, 27, 37, and 39 described above may also produce real time data to be meshed with that produced by monitoring units 31 and 33, and to generate a more complete picture of the ramp area shown in FIG. 1, and this may be communicated to aircraft cockpits and the other locations described above.

It is contemplated that the present monitoring system may be programmed to recognize and signal ramp safety and hazard zones within the boundaries of the fields of view to the pilot in the cockpit driving the aircraft, as well as to others outside the aircraft, such as ground control personnel and air traffic control personnel, to whom this information would be helpful. Safety zones and hazard zones may be defined by, for example, aircraft specifications and/or airlines' and airport's standard operating procedures.

The majority of potential collision or other hazard risks near an aircraft driven into, within, and out of a ramp area are likely to be within a volume or space surrounding the aircraft from the ground surface of the ramp 10 to just above the wings 34 of aircraft 30. As noted above, the monitoring units described herein, such as monitoring units 31 and 33, may be attached to a number of potential aircraft exterior locations, including on the exterior of the aircraft, in or on the ground-facing portion of the fuselage, and on structures attached to the ground-facing portion of the fuselage, including nose and/or main landing gear structures. The monitoring system may be designed so that a pilot in the cockpit may select a view of the aircraft lower fuselage and then a view of an area a desired distance aft of the aircraft from any distance above the aircraft to be able to see this entire area on a single screen. The pilot or crew may also be able to define and select a point of view from the perspective of ground personnel, for example wing walkers and tail walkers, or from the airport terminal, the air traffic control tower, or from any other perspective.

As noted above, the present monitoring system also contemplates equipping ground service vehicles and ground support vehicles, such as the ground service vehicles 36 and the ground service equipment 38 in FIG. 1, with monitoring units 37 and 39. These monitoring units may be integrated into new or available digital systems that monitor and control ramp surface movement of aircraft and other vehicles. The ramp digital system and the present monitoring system may also be integrated into digital systems used by air traffic control in airport towers to monitor and control ground movement. Also as noted above, monitoring units 17, 19, and ii may be respectively provided on the passenger loading bridges 18 and 20 at gates 14 and 16 and on the terminal building 12 to provide a different view of the ramp area 10 than that provided by the monitoring units mounted on the aircraft 30 and the ground vehicles 36 and ground service equipment 38. The real time meshed data from the monitoring units in all of these locations is fed to the artificial intelligence-based processing system described above, which then may communicate visual displays, preferably in a secure encrypted form, of ramp movements that may identify potential ground incidents, as well as any other helpful information, to aircraft cockpit crews, ground crews, drivers of ground service vehicles, operators of ground service equipment, ramp operations supervisors, air traffic control, and others who should receive this information.

It is contemplated that some or all of the real time meshed data from the monitoring units processed by the artificial intelligence-based processing system may be securely communicated to any remote or automated interested party external to the aircraft capable of accelerating or enhancing monitoring and improving safety of an aircraft and its ramp environment. The system may additionally provide the views or feed from devices on a single monitored aircraft or on all monitored aircraft simultaneously or selectively to ground personnel, air traffic control, airline dispatchers, and others responsible for the safe conduct of ramp operations and prevention of collisions within ramp areas. In addition to its use to ensure ramp safety in real time, processed data from the artificial intelligence-based processing system and visual displays of aircraft movements and other ramp activity may be stored for use at a later time.

An additional benefit of the monitoring system and method of the present invention is the improved situational awareness the visual displays described above provide for rapid response teams responding to ramp security threats and incidents, for example the presence of unauthorized or dangerous persons or suspected terrorists in the ramp area.

Figure 2:
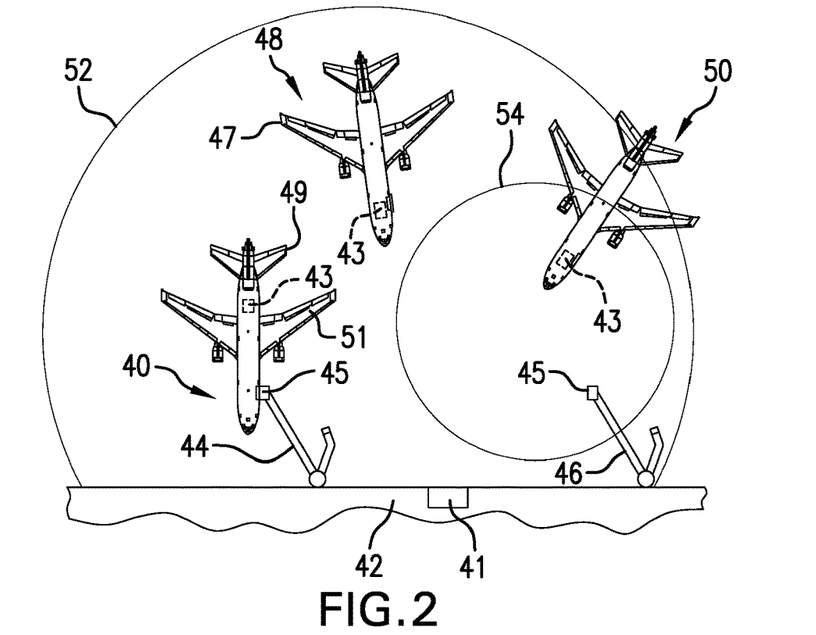
FIG. 2 is a diagrammatic view of aircraft equipped with the monitoring system of the present invention and driven in an airport ramp area with electric taxi drive systems showing areas that may be monitored in accordance with the present invention as the aircraft are driven into the ramp area.
Figure 3:
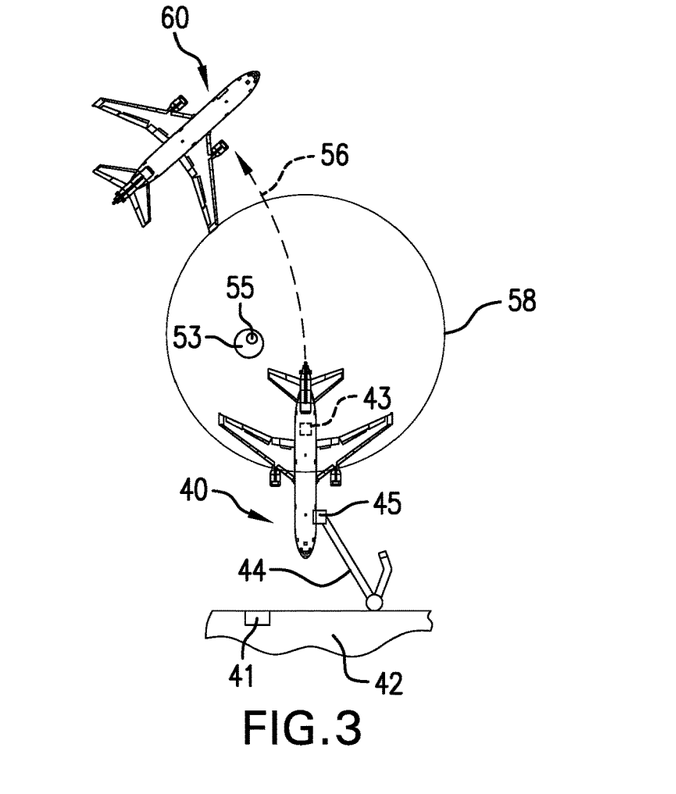
FIG. 3 is a diagrammatic view of aircraft equipped with the monitoring system of the present invention during pushback out of an airport ramp area parking location showing a selected area that may be monitored as an aircraft is driven in reverse with electric taxi drive system during pushback.

FIGS. 2 and 3 illustrate, respectively, aircraft entering an airport ramp area and an aircraft pushing back from an airport ramp parking location to leave a ramp area. Fields of view and monitored areas provided in each situation by monitoring units of the present monitoring system that enable the aircraft to avoid potential collision hazards with aircraft are also illustrated. The aircraft in FIGS. 2 and 3 are all equipped with electric taxi drive systems for ground travel without aircraft engines and tow vehicles. The ground service vehicles, ground service equipment, and personnel, such as those shown in FIG. 1, would also be present in the ramp area, but have been omitted for clarity.

FIG. 2 shows an aircraft 40 in a ramp area parking location connected to an airport terminal 42 by a passenger loading bridge 44. A passenger loading bridge 46 at the terminal 42 is available for connection to an arriving aircraft. Two aircraft 48 and 50 are being driven into the ramp area by the aircraft electric taxi drive systems to park at the terminal 42. The terminal 42 may be equipped with a monitoring unit 41. The aircraft 48 and the aircraft 50 may be equipped with one or more monitoring units 43, as described above, mounted in locations on the aircraft fuselage or on landing gear structures. The portion of circle 52 and the complete circle 54 indicate the respective areas monitored by the monitoring units mounted on each of the aircraft 48 and 50. Real time meshed data from the monitoring units is transmitted to an artificial intelligence-based processing system (not shown) for analysis and communication to the aircraft cockpits, ground control, and any of the other entities mentioned above with responsibility for ramp safety to generate visual representations of these areas. The visual representations may also be projected to display screens in the cockpits of aircraft 48 and 50 and to other displays viewable by ground control and any other entities to which the data has been communicated. Monitoring units 45 may also be located on the passenger loading bridges 44 and 46, and on any ground vehicles, equipment, and/or personnel (not shown) within the ramp area.

The pilot of aircraft 48 may have a single monitoring unit 43, or multiple monitoring units as described above, and these may provide a view of the entire portion of the ramp area visible in FIG. 2. The pilot will be able to view the locations of the aircraft 40, the aircraft 50, the terminal building, and the passenger loading bridges 44 and 46 on a cockpit display screen (not shown). As discussed above, views from the monitoring units may be communicated to other locations. The pilot and crew will be able to change the direction of ground travel to avoid collision between the starboard wing 47 of aircraft 48 and the port tail fin 49 and the port wing 51 of aircraft 40. The pilot of aircraft 50 will be able to see the location of the passenger loading bridge 46 and will be able to change the direction of ground travel to park in an optimum orientation at the passenger loading bridge 46. Monitoring units 45 on the passenger loading bridges 44 and 46 may provide additional data to be meshed with data from monitoring units on aircraft 50. As the aircraft 48 changes its direction of ground travel to avoid contact with aircraft 40, the pilot can control ground travel with the electric taxi drive system to avoid collision with aircraft 50.

As noted above, the ramp area around the aircraft 40, 48, and 50 will also include ground service vehicles, ground service equipment, and personnel, and their locations will be detected by monitoring units 43 on the aircraft, the positions of the aircraft 40, 48, and 50 will be detected by the monitoring units on the ground service vehicles, equipment, or personnel, and the meshed data transmitted to the artificial intelligence-based processing system. Visual displays may be communicated to the cockpits of aircraft 40, 48, and 50 and other control locations. The pilots of aircraft 40, 48, and 50 will be able to change the direction of ground travel or stop ground travel of the aircraft as required to drive the aircraft safely within the ramp area, or this may be done automatically. Aircraft ground direction and travel may also be controlled remotely by ground control.

In addition to a visual display, a signal may also be provided to the pilots of aircraft 48 and 50 to indicate the entrance into and/or the presence of the aircraft in a hazard zone. Another signal may be transmitted to indicate the presence of the aircraft in a safety zone. Alternatively, a constant signal, such as a green light, may be provided when the aircraft is in a safety zone, and a different signal, for example a flashing red light or an audible tone, may indicate intrusion into a hazard zone with the potential for a collision involving the aircraft.

FIG. 3 shows aircraft 40 ready for push back from the passenger loading bridge 44 at the terminal 42. The dashed line 56 indicates a push back ground travel path in the ramp area along which the aircraft 40 may be driven in reverse by the pilot controlling the electric taxi drive system before the aircraft 40 is then driven forward by the electric taxi drive system to a taxiway and takeoff runway. Aircraft 40 is also equipped with the present artificial intelligence-based monitoring system. The circle 58 represents a possible field of view of a monitoring unit 43 on the aircraft 40. The real time meshed data from monitoring unit 43 and other monitoring units is securely transmitted to an artificial intelligence processing system and may then be communicated to a display screen in the cockpit of aircraft 40 where the pilot can see the field of view and/or to the other personnel and/or locations described above. If the pilot continues to drive the aircraft 40 in reverse along the push back path 56, a collision with aircraft 60 could occur. The pilot will be able to change the push back path 56 from that shown or, if necessary, stop the aircraft and avoid a potential collision. If a wing walker or roving unit, represented at 53, is equipped with one of the present monitoring units 55, that monitoring unit may also detect the presence of the aircraft 60 in the push back path 56, and the real time data from the monitoring unit 55 may be meshed with data from the monitoring unit 43 on aircraft 40 for processing by an artificial intelligence processing system and communication to the pilot of aircraft 40 and others with responsibility for ramp safety.

It is contemplated that the monitoring unit 43 on aircraft 40 could be programmed to automatically generate a stop signal when the aircraft has been driven in reverse with the electric taxi drive systems a maximum distance within the ramp where a turn for forward taxi-out may be made safely. The stop signal may be transmitted to the aircraft cockpit so that the aircraft pilot will know that it is safe to stop driving the aircraft in reverse and begin the turning maneuver required to taxi the aircraft with the electric taxi drive systems in a forward direction to a take off location. A LiDAR monitoring unit 43 in combination with artificial intelligence programming may be programmed to predict the reverse travel path of the aircraft 40, taking into account actual ramp environment conditions, such as the presence of the aircraft 60 or other obstacles, along the path required to reach a stop and turn location. As described above, the presence of hazards may be communicated to the cockpit and other locations, and the reverse travel of the aircraft may be automatically or manually interrupted. The location where a stop signal may be generated by the monitoring unit 43 is likely to vary for different airport ramp areas.

FIGS. 2 and 3 represent only a very few examples of possible scenarios in which monitoring units as described herein may provide views of portions of aircraft and adjacent rap surfaces areas not otherwise visible to an aircraft pilot, and transmit meshed real time data for processing, analysis, and communication by an artificial intelligence processing system to provide visual and other information to pilots and all those with responsibility for ramp safety so that collisions and adverse incidents may be avoided.

The present invention further includes a method for monitoring airport ramp surface movement to prevent ground collisions and incidents and improve the safety of ramp operations for aircraft, ground service vehicles, and ramp personnel. Meshed real time data relating to locations of moving and non-moving aircraft, ground service vehicles and equipment, passenger loading bridges, personnel, objects, and anything else in a ramp area may be obtained from the monitoring units of the present monitoring system, and this meshed data may be processed and analyzed, preferably by an artificial intelligence-based processing system using intelligent algorithms, to provide visual displays of ramp conditions and to communicate warnings of potential hazards and, if warranted, to automatically or manually control further movement of the aircraft or other movable vehicles to prevent a collision or ground incident. The data may also be used to analyze and improve overall ramp operations and security.

While the present invention has been described with respect to preferred embodiments, this is not intended to be limiting, and other arrangements and structures that perform the required functions are contemplated to be within the scope of the present invention.

INDUSTRIAL APPLICABILITY

The present invention will find its primary applicability when it is desired to improve the safety, security, and efficiency of an airport ramp area and airside area and to monitor ramp surface ground movement by electric taxi system-driven aircraft and other vehicles and control ground movement to prevent collisions and ground incidents involving electric taxi drive system-driven aircraft and other aircraft, ground service vehicles and equipment, passenger loading bridges, and other vehicles and structures in airport ramp areas.

The invention claimed is:

1. An integrated airport ramp ground surface movement monitoring system that obtains ramp surface operations information from multiple locations, meshes real time data produced by multiple sources at the multiple locations, and transmits artificial intelligence-processed meshed real time data to aircraft pilots and ramp operations control personnel to improve safety, efficiency, and security of airport ramp operations, comprising:
   a. a ramp area adjacent to an airport terminal with a plurality of parking locations, passenger loading bridges, a plurality of aircraft moving within said ramp area into and out of said parking locations, and a plurality of ground service and support vehicles and ground equipment;
   b. at least some of said plurality of aircraft driven within said ramp area by electric taxi drive systems;
   c. multiple monitoring units mounted in multiple exterior locations on one or more of said passenger loading bridges, said plurality of ground service and support vehicles, ground equipment and personnel, and on said airport terminal operative to produce composite streams of meshed real time data in the form of views of said entire ramp area from said multiple monitoring units, wherein said multiple monitoring units comprise at least single or multiple cameras, scanning LiDAR devices and proximity sensors, or combinations of cameras, proximity sensors, and scanning LiDAR devices;
   d. an artificial intelligence-based processing system comprising intelligent algorithms operative to receive said composite streams of meshed real time data representing said views from said multiple exterior locations in a secure encrypted form, to process said meshed data to produce visual displays of said views from said one or more locations, and to communicate said processed meshed data in the form of secure visual displays in a secure encrypted form of said entire ramp area and signals in real time to pilots of said plurality of aircraft and to ramp control operations personnel or to store said processed meshed data; and
   e. display devices to receive said communicated secure visual displays located in at least cockpits of said plurality of aircraft.

2. The monitoring system of claim 1, wherein said multiple monitoring units are mounted on said at least some of said plurality of said electric taxi drive system-driven aircraft to produce said composite streams of real time meshed data with views of said ramp area from said plurality of electric taxi drive system-driven aircraft.

3. The monitoring system of claim 2, wherein said multiple monitoring units are mounted only on said electric taxi drive-system-driven aircraft and on said ground service and support vehicles and said ground equipment to produce said composite streams of real time meshed data with views of said ramp area from said electric taxi drive system-driven aircraft, said ground service and support vehicles, and said ground equipment.

4. The monitoring system of claim 2, wherein said multiple monitoring units are mounted only on said electric taxi drive-system-driven aircraft and on said airport terminal, and said passenger loading bridges to produce said composite streams of real time meshed data with views of said ramp area from said electric taxi drive system-driven aircraft, said airport terminal and said passenger loading bridges.

5. The monitoring system of claim 1, wherein said multiple monitoring units are mounted on said plurality of aircraft in said ramp area not driven by electric taxi drive systems to produce said composite streams of meshed real time data with views of said ramp area from said plurality of aircraft not driven by electric taxi drive systems.

6. The monitoring system of claim 1, further comprising display devices located in a ground control location and in an air traffic control tower location to receive said communicated secure visual displays from said artificial intelligence-based processing system.

7. The monitoring system of claim 1, further comprising robotic roving units functioning as ground personnel or ground personnel with said multiple monitoring units positioned on said robotic roving units or on said ground personnel to produce said composite streams of real time meshed data with views of defined blind spot areas in said ramp area.

8. The monitoring system of claim 7, wherein said multiple monitoring units, each comprising a scanning LiDAR device and a camera, are mounted on said electric taxi system-driven aircraft and on said robotic roving units to produce said composite streams of real time meshed data with views of said ramp area from said plurality of electric taxi drive system-driven aircraft and views of said blind spot areas in said ramp area from said robotic roving units.

9. An integrated monitoring method that obtains ramp surface movement information of an entire airport ramp area from multiple locations, meshes real time data produced by multiple sources at the multiple locations, and transmits artificial intelligence-processed meshed real time data to aircraft pilots and ramp control operations personnel to improve safety, efficiency, and security of airport ramp operations, comprising:

a. providing multiple monitoring units comprising at least single or multiple cameras, scanning LiDAR devices and proximity sensors, or combinations of cameras, proximity sensors, and scanning LiDAR devices, and, in a ramp area adjacent to an airport terminal with a plurality of parking locations and passenger loading bridges, providing a plurality of aircraft, at least some of the aircraft moved during ground travel within the ramp area by electric taxi drive systems, and providing a plurality of ground service vehicles, ground support vehicles, and ground equipment;

b. mounting the multiple monitoring units in multiple exterior locations on the electric taxi drive system-driven aircraft, passenger loading bridges, ground service vehicles, ground support vehicles, and ground equipment, the monitoring units operating to produce composite streams of meshed real time data from the multiple locations as ground personnel and the ground vehicles move within the ramp area and the aircraft are driven within the ramp area into and out of the parking locations;

c. providing an artificial intelligence-based processing system comprising intelligent algorithms to receive the composite streams of meshed real time data from the multiple monitoring units, processing the composite streams of real time meshed data, communicating the processed real time meshed data in the form of secure visual displays of the entire ramp area and signals in a secure encrypted form in real time to display devices located in at least cockpits of the aircraft as the aircraft are driven within the ramp area; and d. in response to the communicated real time secure visual displays of the entire ramp area, continuing to move the aircraft within the ramp area into and out of the parking locations, stopping movement of the aircraft, or continuing to move or stopping movement of the ground vehicles and personnel.

10. The method of claim 9, further comprising communicating the processed real time meshed data in the form of the secure visual displays of the entire ramp area in the secure encrypted form to display devices located in aircraft cockpits, ground control locations, and air traffic control tower locations.

11. The method of claim 9, further comprising mounting multiple monitoring units on exteriors of the plurality of the passenger loading bridges and on exteriors of airport terminal structures, obtaining the composite streams of real time meshed data of ramp area spaces adjacent to the plurality of passenger loading bridges and the airport terminal structures from the multiple monitoring units, transmitting the composite streams of real time meshed data in a secure encrypted form to the artificial intelligence-based processing system, processing the real time meshed data to produce the secure visual displays of the ramp area spaces from the plurality of passenger loading bridges and the airport terminal structures, and communicating the secure visual displays to display devices located in aircraft cockpits, ground control locations, and air traffic control tower locations.

12. The method of claim 9, further comprising providing multiple monitoring units for ground personnel and for robotic roving units functioning as ground personnel, mounting the monitoring units on multiple locations on the ground personnel and on the robotic roving units, obtaining the composite streams of real time meshed data of ramp area spaces adjacent to the ground personnel and the roving robotic units as the ground personnel and the roving robotic units move on the ramp area ground surface, transmitting the composite streams of real time meshed data in a secure encrypted form to the artificial intelligence-based processing system, processing the composite streams of real time meshed data to produce the secure visual displays, and communicating the secure visual displays from the ground personnel and the robotic roving units to display devices located in aircraft cockpits, ground control locations, and air traffic control tower locations.

13. The method of claim 12, further comprising providing the multiple monitoring units on robotic roving units, positioning at least one of the robotic roving units in a ramp area location with an identified blind spot, obtaining composite streams of real time meshed data of views of ramp spaces adjacent to the identified blind spot from the multiple monitoring units on the at least one robotic roving unit as aircraft are driven with the electric taxi drive systems to maneuver near or into the blind spot, and the at least one of the robotic roving units moves in the ramp area adjacent to or near the blind spot, transmitting the composite streams of real time meshed data of the spaces adjacent to the blind spot to the artificial intelligence-based processing system in a secure encrypted form, processing the composite streams of real time meshed data, and communicating the processed real time data in the form of secure visual displays of the spaces adjacent to the blind spot from the at least one of the robotic roving units to at least a display device located in a cockpit of the aircraft.

14. The method of claim 9, further comprising mounting multiple monitoring units in multiple exterior locations on the aircraft driven by electric taxi drive systems, obtaining panoramic views of ramp area spaces and surfaces adjacent to the aircraft exteriors, producing a composite stream of real time meshed data of said panoramic views, transmitting the composite stream of real time meshed data to the artificial intelligence-based processing system in a secure encrypted form, processing the composite stream of real time meshed data to produce secure visual displays of said panoramic views, and communicating the secure visual displays of the panoramic views to display devices in aircraft cockpits, ground control locations, and air traffic control tower locations in a secure encrypted form.

15. The method of claim 9, further comprising wherein multiple aircraft are driven in the ramp area by the electric taxi drive systems, transmitting the composite streams of real time meshed data from the multiple monitoring units on the multiple aircraft in a secure encrypted form representing views of the ramp from each of the multiple monitoring units to the artificial intelligence-based processing system, processing the composite streams of real time meshed data, analyzing the secure processed data, and storing the analyzed data in a secure encrypted form for further analysis and use at a later time if the analyzed data does not identify a safety or collision hazard.

16. The method of claim 9, further comprising mounting multiple monitoring units in multiple locations on exteriors of the plurality of aircraft not driven by electric taxi drive systems, obtaining composite streams of real time meshed data representing views of ramp area spaces adjacent to the exteriors of the aircraft not driven by electric taxi drive systems, transmitting the composite streams of real time meshed data to the artificial intelligence-based processing system in a secure encrypted form, processing the composite streams of real time meshed data from the multiple monitoring units, and communicating the processed real time meshed data in the form of secure visual displays of views of the ramp area from the aircraft not driven by electric taxi drive systems to display devices located in aircraft cockpits, ground control locations, and air traffic control tower locations.

17. The method of claim 9, further comprising mounting multiple monitoring devices only on fixed locations comprising the airport terminal and immobile structures in the ramp area, producing composite streams of real time meshed data representing views of the entire ramp area from the fixed locations, transmitting the composite streams of real time meshed data in a secure encrypted form to the artificial intelligence-based processing system, processing the composite streams of real time meshed data, and communicating the processed meshed real time data in the form of secure visual displays of the entire ramp area from the fixed locations to display devices in aircraft cockpits, ground control locations, and air traffic control tower locations.

18. The method of claim 9, wherein each of the multiple monitoring units comprises a scanning LiDAR device and a camera.

* * * * *